June 11, 1963 R. R. LEAMING 3,093,727
ELECTRIC WELDING APPARATUS AND CONTROL SYSTEM
Filed July 9, 1959 3 Sheets-Sheet 1

INVENTORS
ROBERT R. LEAMING
BY Robert C. Sullivan
ATTORNEY

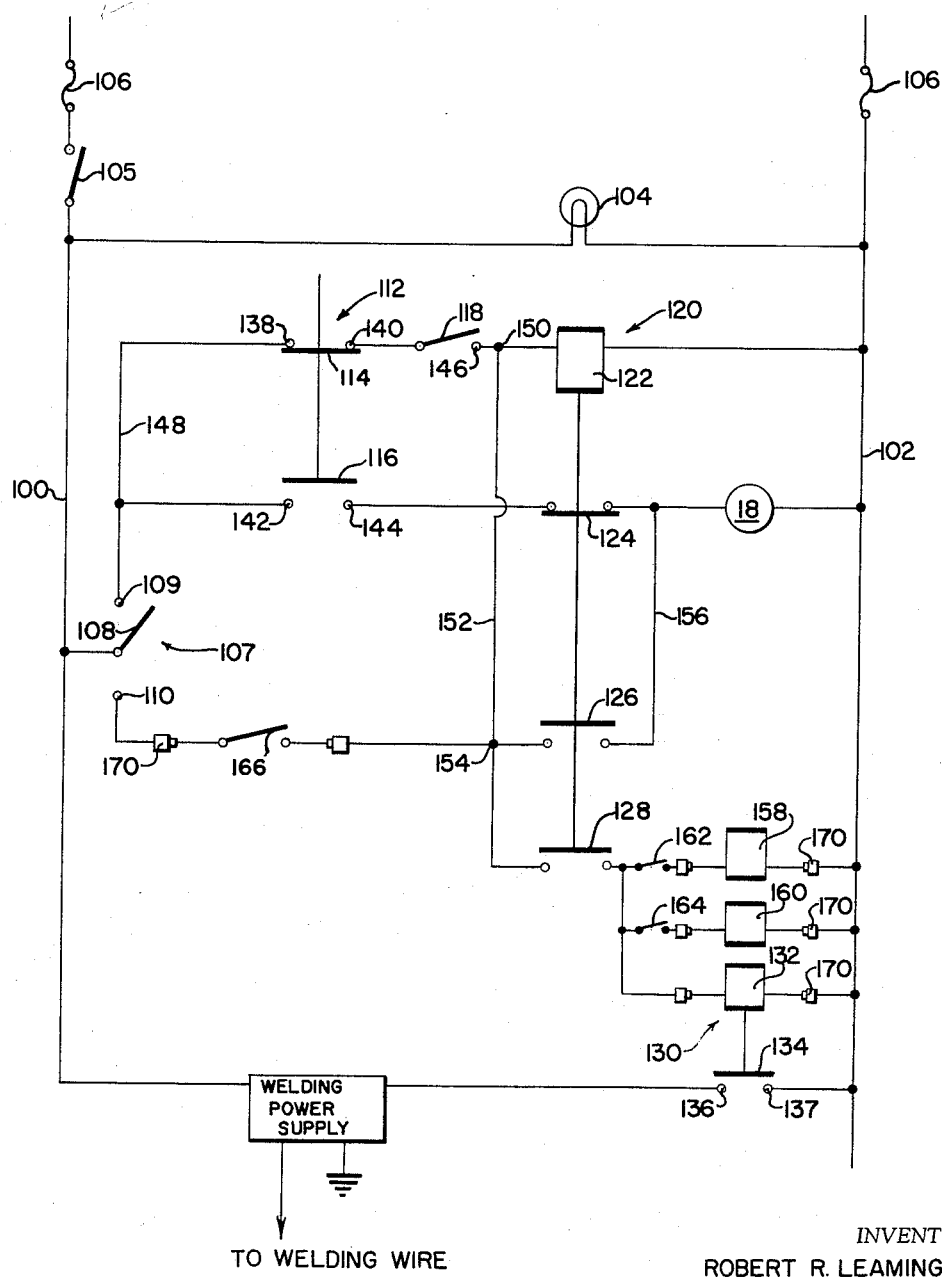

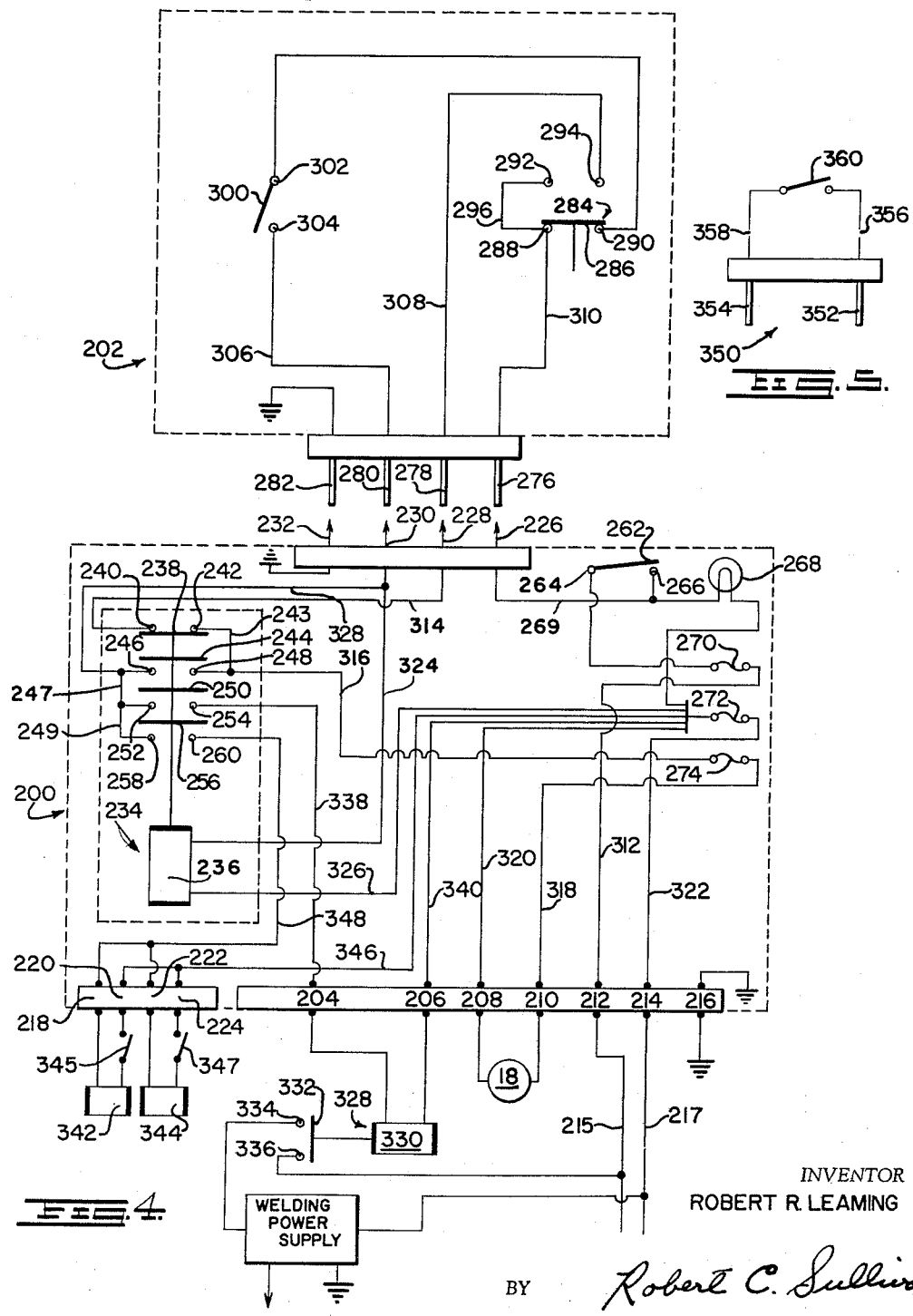

United States Patent Office

3,093,727
Patented June 11, 1963

---

3,093,727
ELECTRIC WELDING APPARATUS AND CONTROL SYSTEM
Robert R. Leaming, Rahway, N.J., assignor to Metal & Thermit Corporation, Woodbridge Township, N.J., a corporation of New Jersey
Filed July 9, 1959, Ser. No. 826,022
6 Claims. (Cl. 219—130)

This invention relates to electrical arc welding and more particularly to an apparatus and control system for feeding and energizing a welding wire or rod which may be selectively used for either automatic or semi-automatic arc welding operations.

In automatic arc welding operation in which a carriage carrying the welding wire or rod traverses a fixed path, it is the usual practice to "inch" the welding wire down toward the work with the wire deenergized or "cold" and with the end point of the inching operation being dependent upon the means used for initiating the arc, such as scratch start, steel wool, high frequency, etc. After the wire has been cold inched to the proper position relative to the work, electrical circuit connections are then established which cause the welding wire to be electrically energized and which also cause a wire-feeding device to continuously feed the welding wire to the work in its energized or "hot" condition. Thus, automatic arc welding operation requires establishing of electrical connections to (1) permit "cold" inching of the welding wire or rod with the wire deenergized; and (2) after preliminary adjustment of the height of the wire by cold inching to then provide a continuous feed of the wire with the wire "hot" or energized.

In semi-automatic welding operation, the welding wire is fed through a flexible hose to a welding gun having a control trigger switch thereon which controls the feeding of the wire and also its energization. In the semi-automatic operation, actuation of the trigger switch on the welding gun completes a circuit which energizes a wire feeding device to cause the wire to be fed to the welding gun and also completes a circuit which energizes the wire.

While wire feeding devices with associated electrical controls are available for use in either automatic or semi-automatic arc welding operation, so far as we know there is no wire feeding device and associated control system available adapted for use in either automatic or semi-automatic arc welding operations, or which may be simply converted from either automatic to semi-automatic operation or vice-versa.

Accordingly, it is an object of this invention to provide a wire or rod feeding apparatus and an associated control system therefor which may be selectively used for either automatic or semi-automatic arc welding operation.

It is another object of this invention to provide a control system for a wire or rod feeding device for electrical arc welding which permits easy conversion from automatic or semi-automatic welding operation, or vice-versa.

In achievement of these objectives, there is provided in accordance with an embodiment of this invention a wire feeding apparatus for feeding a welding wire or rod toward a workpiece, including wire feed rolls which are driven by an electric motor. A control system is provided as part of the assembly and includes a control circuit which may be selectively actuated by suitable control switches to provide feeding and energization of the welding wire for either automatic or semi-automatic operation, as desired. When the control system is actuated to its "Automatic" welding operation position, the welding wire may first be "cold" inched to the proper position relative to the workpiece and then subsequently be automatically fed by the wire feed device in an energized or "hot" condition. When the control system is actuated to its "Semi-automatic" condition, both the feeding and energization of the welding wire may be manually controlled by the trigger switch of a manual welding gun. Actuation of the trigger switch on the welding gun causes movement of the welding wire through a flexible hose which conducts the welding wire to the welding gun, and causes the welding wire to be energized whenever it is being fed to the workpiece.

Further objects and advantages of the invention will become apparent from the following description taken in conjunction with the accompanying drawings in which:

FIG. 3 is a schematic wiring diagram of the electrical control system for the apparatus of FIG. 1;

FIG. 4 is a schematic wiring diagram of a modified control system for the apparatus of FIG. 1; and FIG. 5 is a diagrammatic view of a plug-in connection for use with the control system of FIG. 4 which adapts the control system for use in semi-automatic welding operation.

Figure 1:
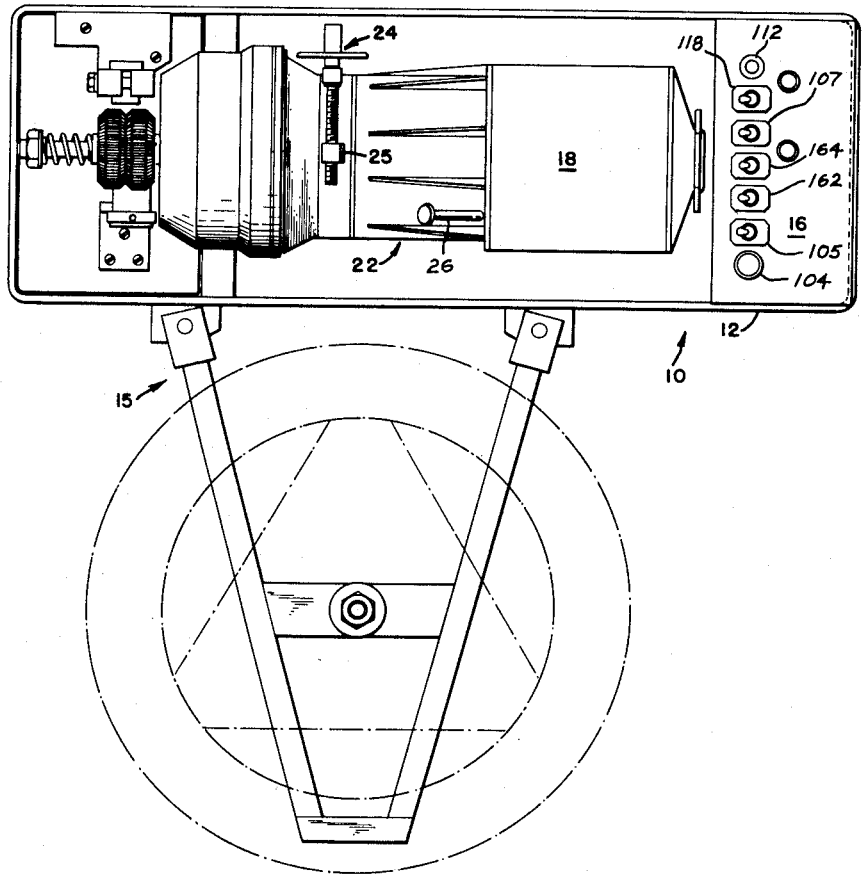
FIG. 1 is a top plan view of a wire feeding apparatus in accordance with the invention.
Figure 2:
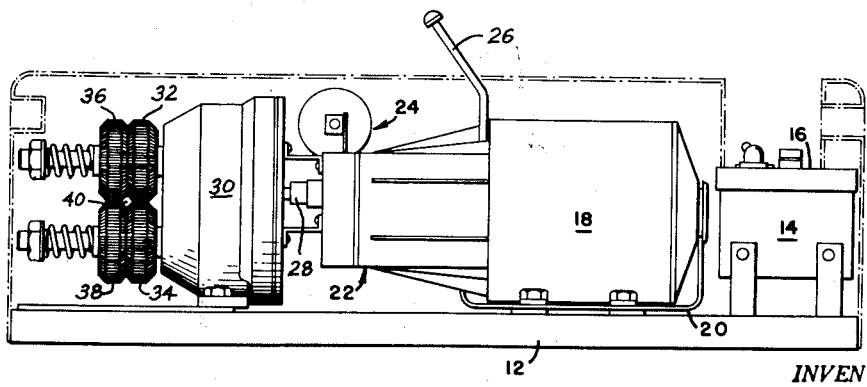
FIG. 2 is a side elevation view of the wire feeding apparatus of FIG. 1.

Referring now to the drawings, and more particularly to FIGS. 1 and 2, there is shown a welding wire or rod feeding apparatus generally indicated at 10 mounted upon a base member 12 and including an electrical control box 14 having a control panel 16 on which are mounted the various control switches for controlling the electrical operation of the wire feeding apparatus. A bracket assembly generally indicated at 15 is attached to base member 12 and provides a support for the reel of welding wire which is fed by the wire-feeding apparatus.

An electric drive motor 18 is supported on base 12 by bracket 20 and the output shaft of electric motor 18 is connected in direct driving relation to the input shaft of a variable speed transmission generally indicated at 22 having a speed control adjusting screw 24 and a reversing lever 26 which reverses the direction of the output shaft of the variable speed transmission although the direction of rotation of the motor and of the input shaft of the variable speed transmission remains constant. The output shaft 28 of variable speed transmission 22 is connected in driving relation to suitable speed reduction gearing in gear housing 30 which, in turn, drives wire feed rolls 32, 34, 36, and 38. The welding wire is frictionally engaged and driven by the four feed rolls in the region indicated at 40 in FIG. 2. The variable speed transmission 22 and its connection to the wire feed rolls may be similar to that described in copending application Serial No. 809,454, entitled "Wire Feeding Mechanism for Welding Machines," filed April 28, 1959.

The electrical control system for the wire feed motor 18 which permits selective operation of the wire feeding mechanism for either automatic or semi-automatic welding operation will now be described.

Referring to FIG. 3 of the drawings which shows a preferred embodiment of the control system, the electrical conductors which supply the power for both the control system and also for the welding power supply are indicated at 100 and 102. A pilot light 104 across conductors 100 and 102 indicates when the conductors are connected to the electrical power source through switch 105 and fuses 106. A selector switch generally indicated at 107 is provided whose position determines whether the control system is connected for automatic or semi-automatic operation. Selector switch 107 is a single-pole, double-throw switch and includes a single pole member 108 connected to power line 100. Pole 108 of switch 107 may be selectively thrown into contact with terminal 109 for automatic operation or into contact with terminal 110 for semi-automatic operation.

The control system includes an "inch button" generally indicated at 112 having a normally closed contact 114 and a normally open contact 116. Also included in the system are a manually operated single-pole, single-throw disconnect switch 118 and a relay generally indicated at 120, including a coil 122 which operates a normally closed contact 124 and two normally open contacts 126 and 128, respectively. The system also includes a main contact relay generally indicated at 130 including a coil 132 which operates a normally open contact 134. When contact 134 is moved to closed position by energization of coil 132, the power supply circuit to the welding wire is completed across terminals 136 and 137.

*Automatic Operation With Controls of FIG. 3*

If the wire feeding apparatus 10 is to be used for automatic operation, in which the welding wire is moved along the workpiece by a traversing carriage, and if the welding wire is to be first cold inched into position, contactor switch 118 is manually opened and pole member 108 of selector switch 107 is thrown to the "automatic" position in which it engages terminal 109. To initiate the cold inching operation, inch button 112 is depressed to open normally closed contact 114 out of bridging relation to terminals 138 and 140 and to close normally open contact 116 into bridging relation with terminals 142 and 144. Since coil 122 of relay 120 is open due to normally closed contact 114 of the inch button being open and also due to contactor switch 118 being open, normally closed contact 124 of relay 120 is closed and normally open contacts 126 and 128 of relay 120 are open. When the inch button 112 is actuated to cause contact 116 to bridge terminals 142 and 144, a circuit is completed to energize the wire feed motor 18, as follows: From power line 100 through switch 107 to terminal 109, through contacts 116 and 124, through motor 18 to the opposite power line 102. This permits cold inching of the wire feed motor 18 to position the welding wire at the proper predetermined heights for the automatic welding operation. During the inching operation, the welding wire remains deenergized since manually operated contactor switch 118 in series with coil 132 of main contactor relay 130 is open. Also, due to switch 118 being open, coil 122 of control relay 120 is deenergized, causing contact 128 in series with switch 118 and coil 132 to also be open.

After the welding wire has been properly positioned by cold inching as just described and with pole 108 of switch 107 remaining in "Automatic" position in which it engages terminal 109, inch button 112 is released to its unactuated position and contactor switch 118 is then manually thrown to a closed position in which it engages terminal 146. This then completes the energization circuit of coil 122 of control relay 120 from power line 100 through switch 107, terminal 109, through normally closed contact 114 of inch button 112, through disconnect switch 118, terminal 146, coil 122, thence to power line 102. With coil 122 of control relay 120 energized, normally closed contact 124 of relay 120 is opened and normally open contacts 126 and 128 of relay 120 are closed. The wire feed motor 18 is then energized through the following path: From power line 100 through closed switch 107 in automatic position to terminal 109, through conductor 148 to terminal 138 and through closed contact 114 of inch button 112, through closed contactor switch 118 to junction 150, thence through conductor 152 to junction 154, and through closed contact 126 of relay 120 and conductor 156 to wire feed motor 18, through wire feed motor 18 to power line 102.

At the same time, the coil 132 of main contactor relay 130 is energized to close contact 134 to thereby close the electrical power supply circuit to the welding wire. Thus, with the control switch 107 in automatic position and with the inch button 112 in unactuated position in which contact 114 of the inch button is closed, both the wire feed motor 18 and the main contact relay 130 are energized, thereby feeding the welding wire to the workpiece and at the same time energizing the welding wire. The circuit for energization of coil 132 is the same as that described for wire feed motor 18 down to junction point 154. From junction point 154, the circuit to coil 132 passes through closed contact 128 of relay 120 and through coil 132 to power line 102.

Solenoids 158 and 160 which control the flow of gas and water for gas shielded welding are in parallel with coil 132. However, separate switches 162 and 164 are placed in series with the respective solenoids 158 and 160 to permit opening of the circuits of the respective solenoids even though the circuit to coil 132 may be completed as previously described.

*Semi-Automatic Operation With Controls of FIG. 3*

When it is desired to use the wire feeding apparatus for semi-automatic operation in which the wire is fed through a hollow conduit to a welding gun, the selector switch 107 is thrown to semi-automatic position in which pole member 108 contacts terminal 110. This completes a circuit from power line 100 through trigger switch 166 on the welding gun to junction 154 and thence through conductor 152 and coil 122 of control relay 120 to power line 102. Coil 122 is thereby energized to close contacts 126 and 128. The closing of contact 126 completes the circuit through trigger switch 166, conductor 156, through wire feed motor 18 to power line 102. The circuit is also completed through trigger switch 166, junction 154, and closed contact 128 through coil 132 of main contact relay 130 to power line 102. Thus, with switch 107 in semi-automatic position, circuits are completed to energize wire feed motor 18 and to energize main contact relay 130 which, in turn, closes contact 134 to complete the power supply circuit to the welding wire whenever the trigger switch 166 on the welding gun is closed. Whenever the trigger switch 166 is opened, wire feed motor 18 is deenergized and the power supply to the welding wire is cut off.

*Control System of FIG. 4*

Referring now to the modified control system shown in FIG. 4, the control system includes a main control box generally indicated at 200 and an auxiliary automatic control box generally indicated at 202 which is detachably connected by a plug-in connection to the main control box when the wire feeding apparatus is to be used for automatic welding, and which is detached from its plug-in connection to the main control box when the wire feeding apparatus is to be used for semi-automatic welding.

The main control box 200 includes a plug-in receptacle including seven terminal members 204, 206, 208, 210, 212, 214, and 216, and a second receptacle member having terminals 218, 220, 222, and 224, respectively. The main control box 200 also includes a four-prong receptacle including the terminals 226, 228, 230, and 232, respectively, into which a four-prong plug carried by the auxiliary control box 202 is plugged when the apparatus is being used for automatic welding.

Positioned in main control box 200 is a relay generally indicated at 234 including a relay coil 236, a normally closed contact 238 which bridges terminals 240, 242, a first normally open contact 244 which bridges terminals 246 and 248, a second normally open contact 250 which bridges terminals 252 and 254, and a third normally open contact 256 which bridges terminals 258 and 260. The main control box 200 also includes a single pole on-off switch 262 which bridges terminals 264, 266, a pilot light 268, and three fuses 270, 272, and 274.

The auxiliary switch box generally indicated at 202 includes a four-prong plug including terminals 276, 278, 280, 282. An "inch button" generally indicated at 284 is provided in box 202 and includes a contact element 286 which in its normally closed unactuated position is adapted to bridge terminals 288 and 290 and in its actuated position is adapted to bridge terminals 292 and 294. A jumper 296 is connected between terminals 288 and 292. A manually operable single pole, single throw disconnect switch 300 adapted to bridge terminals 302 and 304 when closed is connected in series with conductor 306 between terminal 280 of the four-prong plug and terminal 290 of the inch button. Also, a conductor 308 is connected between terminal 278 of the four-prong plug and terminal 294 of the inch button, and a conductor 310 is connected betwen terminal 276 of the four-prong plug and terminal 288 of the inch button.

*Automatic Operation With Controls of FIG. 4*

When it is desired to use the wire feeder for automatic operation, auxiliary switch box 202 is plugged into the main control box 200 so that the four terminals 276, 278, 280 and 282 of the auxiliary switch box respectively engage the terminals 226, 228, 230, and 232 of the four-prong receptacle on main control box 200.

With the auxiliary control box plugged in as just described, the sequence for inching the welding wire into a predetermined position adjacent the workpiece with the welding wire "cold" or deenergized, is as follows:

The on-off switch 262 is moved to the closed position in which the single pole of the switch bridges terminals 264 and 266. The inch button 284 in auxiliary control box 202 is manually pushed to bridge terminals 292 and 294. This establishes an electrical circuit to the wire feed motor 18 as follows: From power line 215 to terminal 212 on the main control box 200, through conductor 312 and fuse 270 to terminal 264 of on-off switch 262, through switch 262 and conductor 269 to terminal 226 of the four-prong receptacle on the main control box, to terminal 276 of the four-prong plug on auxiliary switch box 202, through conductor 310, terminal 288, bridging conductor 296, to terminal 292 of inch button 284, through bridging contact 286 of the inch button to terminal 294, through conductor 308 to terminal 278 of the four-prong plug on switch box 202, to terminal 228 of the four-prong receptacle on the main control box, through conductor 314 to terminal 240 on relay 234, through normally closed contact 238 of the relay to terminal 242, through jumper 243 to conductor 316 to fuse 274, through fuse 274, through conductor 318 to terminal 210 on the main control box 200, from terminal 210 to one side of wire feed motor 18, through the wire feed motor to terminal 208 of the main control box, from terminal 208 through conductor 320 to fuse 272, through fuse 272 and conductor 322 to terminal 214 of the main control box 200 and thence to power line 217. A circuit has thus been completed through inch button 284 of the auxiliary switch box 202 and through the normally closed contact of the deenergized control relay 234 of main control box 200 to complete a power circuit to wire feed motor 18. However, since control relay 234 remains deenergized, the circuits which control the application of electrical power to the welding wire remain open and the wire is cold or deenergized while it is being inched into the proper position relative to the workpiece.

After the wire has been cold inched to the proper position relative to the workpiece and it is then desired to begin automatic feeding of the wire with the wire energized or "hot," the inch button 284 is released and permitted to return to its normally closed position in which contact 286 bridges terminals 288 and 290 and switch 300 is closed to bridge terminals 302 and 304. The circuit starting from power line 215 and terminal 212 on the main control box is the same as that previously described for the cold inching operation up to terminal 288 of inch button 284. However, since inch button 284 is now in its normally closed or unactivated position in which contact member 286 bridges terminals 288 and 290, and since switch 300 is in closed position, the circuit is now completed from terminal 288 through bridging contact element 286 to terminal 290, through closed switch 300 and conductor 306 to terminal 280 of the four-prong plug on auxiliary switch box 202, thence to terminal 230 of the four-prong receptacle on the main control box 200. The circuit then follows a parallel path. The first branch of the parallel path includes conductor 324 to control relay coil 236, through relay coil 236, through conductor 326 and fuse 272 to conductor 322 and terminal 214 of the main control box and thus to power line 217. Thus the coil 236 of relay 234 is energized and opens normally closed contact 238 and closes normally open contacts 244, 250, 256.

The other parallel path completed from terminal 230 of the main control box follows through conductor 328 to terminal 246 of relay 234, through the closed bridging contact 244 to terminal 248, thence through conductor 316, fuse 274, conductor 318, terminal 210, through wire feed motor 18 back to terminal 208, thence through conductor 320 to fuse 272, through fuse 272 and conductor 322 to terminal 214 and thence to power line 217, thus completing the connection of the wire feed motor 18 across the power supply lines 215–217.

With the auxiliary switch box 202 plugged into the main control box 200 and with switch 300 in closed position, a circuit is also completed to energize the main contact relay generally indicated at 328 and including a coil 330 and a contact member 332 which bridges terminals 334 and 336 in the power supply to the welding wire. The circuit by which this is accomplished is the same as that previously described for the energization of the wire feed motor 18 up to terminal 246 of relay 234. The path of the energization of main contact relay coil 330 is then as follows: From terminal 246 through jumper 247 to terminal 252, through bridging contact 250 to terminal 254, through conductor 338 to terminal 204 of the main control box, thence to one side of main contact relay coil 330, through main contact relay coil 330 to terminal 206 thence through conductor 340 to fuse 272, through fuse 272 to conductor 322, to terminal 214, to power line 217, thereby completing the energization circuit of main contact relay coil 330 across power line 215–217. Completion of this circuit energizes main contact relay coil 330 and closes contact 332 to bridge terminals 334 and 336 in the power supply circuit to the welding wire.

Energization of the coil 236 of control relay 234 is also effective to close the circuits to solenoids 342, 344 which respectively control the flow of gas and of water for use in gas shielded welding. The circuits to the gas and water solenoids are completed through the normally open contact 256 which is closed when coil 236 of control relay 234 is energized. One terminal of each of the gas and water solenoids 342, 344 is parallel-connected to a terminal of the other and to one side of the power line 217 through conductor 346 which is connected through fuse 272 and conductor 322 to power line 217. The other terminals of the gas and water solenoids are also parallel-connected to each other and then connected through conductor 348, contact 256 of relay 234, jumpers 249 and 247, and conductor 328 to terminal 230 of the four-prong receptacle on main control box 200. As previously explained, a circuit is completed through this terminal to power line 215 when switch 300 of the auxiliary switch box is manually closed.

Manual control switches 345, 347 are connected in the circuits of the respective solenoids 342, 344 to permit these solenoids to be placed in or out of operation as desired.

*Semi-Automatic Operation With Controls of FIG. 4*

To use the control circuitry of FIG. 4 for semi-automatic operation, that is, when the welding wire is fed through a flexible hose to a welding gun operated by a trigger on the welding gun, the auxiliary switch box 202 is disconnected from the four-prong receptacle and a plug member generally indicated at 350 in FIG. 5 is plugged into the four-prong receptacle so that the terminals 352 and 354 on plug 350 engage terminals 226 and 230, respectively, on main control box 200. Leads 356 and 358 extend from plug 350 to a single pole trigger switch 360 on the welding gun. When trigger switch 360 is closed it completes the cricuits across terminals 226 and 230 of the four-prong receptacle to energize coil 236 of control relay 234 and thereby close normally open contacts 244, 250 and 256 of the relay. As previously explained, closing contacts 244 and 250 completes the circuits to energize wire feed motor 18 and to energize coil 330 of relay 328 which closes contact 332 in the electrical power supply to the welding wire. Closing of contact 256 of control relay 234 also closes the circuit to the gas and water solenoids 342 and 344 as previously explained, provided the switches 345 and 347 in the circuits of these solenoids are closed. Thus, in semi-automatic operation the closing of trigger switch 360 on the welding gun is effective to energize the wire feed motor 18 and to close the electrical power supply circuit to the welding wire so that the welding wire can be fed in a "hot" or energized condition from the welding gun at the will of the operator of the welding gun.

It can be seen from the foregoing that there is provided in accordance with this invention the combination of a wire or rod feeding apparatus for electric arc welding and a control system therefor which permits the wire feeding apparatus to be used seelctively for either automatic or semi-automatic operation and to be easily converted from one type of operation to the other by simple actuation of a switch or by suitably changing a plug-in connection. When the apparatus and its associated control system are actuated for automatic operation, the welding wire or rod may be "cold" inched into proper position as is necessary in properly orienting the wire with respect to the workpiece in automatic welding operation, and then subsequently continuously fed by the wire feeding device in a "hot" or energized condition. If it is desired to use the apparatus for semi-automatic operation, this can be accomplished by simply throwing a switch or making a suitable change of a plug-in connection which permits the welding wire to be fed from the wire feed device through a flexible hose to a manually operated welding gun at the will of the operator by actuation of the trigger on the welding gun, actuation of the manually operated trigger also serving to concurrently energize the welding wire.

While there have been shown and described particular embodiments of the invention, it will be obvious to those skilled in the art that various changes and modifications therein may be made without departing from the invention and, therefore, it is aimed to cover all such changes and modifications as fall within the true spirit and scope of the invention.

I claim:

1. An electrical welding apparatus and system adapted to be used selectively for either automatic or semi-automatic welding operation, comprising electric motor means for feeding an elongated welding material to a workpiece; an electrical circuit for said motor means and an electrical circuit connecting said welding material to a source of electrical power; electrical control means selectively operable to a first condition for automatic welding operation in series with an "inch" switch, said "inch" switch being connected to electrical power only when said control means is in said first condition; said "inch" switch being movable to a first position in which it closes the electrical circuit of the motor means and opens the electrical circuit of the welding material to thereby permit "cold inching" of the welding material; said "inch" switch being movable to a second position in which it concurrently closes the electrical circuits of both said motor means and of said welding material; said electrical control means being selectively operable to a second condition for semi-automatic operation in which said control means is in circuit with a switch on a welding gun, whereby operation of the switch on the welding gun is effective to concurrently complete the electrical circuits of both said motor means and of said welding material.

2. An electrical welding apparatus and system adapted to be used selectively for either automatic or semi-automatic welding operation, comprising electric motor means for feeding an elongated welding material to a workpiece; an electrical circuit for said motor means and an electrical circuit connecting said welding material to a source of electrical power; a selector switch movable to a first position corresponding to automatic operation or to a second position corresponding to semi-automatic operation; a manually operable "inch" switch controlling contacts in the electrical circuits of said motor means and of said welding material; said contacts controlled by said "inch" switch being connected to electrical power only when said selector switch is in said first or automatic position; said "inch" switch being movable to a first position in which it closes the electrical circuit of the motor means and opens the electrical circuit of the welding material to thereby permit "cold inching" of the welding material; said inch switch being movable to a second position in which it concurrently closes the electrical circuits of both said motor means and of said welding material; said selector switch when in said second or semi-automatic position being in circuit with the trigger switch on a welding gun whereby completion of the circuit through the trigger switch causes concurrent energization of said motor means and of said welding material.

3. An electrical welding apparatus and system adapted to be used selectively for either automatic or semi-automatic welding operation, comprising electric motor means for feeding an elongated welding material to a workpiece; an electrical circuit for said motor means and an electrical circuit connecting said welding material to a source of electrical power; a control relay means including contacts in the circuits of said motor means and of said welding material; selector switch means selectively operable to a first position for automatic welding operation and to a second position for semi-automatic welding operation; a manually operable "inch" switch connected to said selector switch when said selector switch is in said first position, said "inch" switch including contacts connecting said relay means and said motor means to electrical power, said "inch" switch being selectively movable to a first position in which said relay means is deenergized to thereby open contacts controlled by said relay means in the electrical circuits of said motor means and of said welding material, said "inch" switch when in said first position thereof closing a separate circuit to electrical power for said motor means whereby the welding material may be "cold inched" to the workpiece; said "inch" switch being selectively movable to a second position in which said relay means is energized to thereby close contacts controlled by said relay means to concurrently electrically energize said motor means and said welding material; said selector switch when in said second or semi-automatic position being in circuit with the trigger switch on a welding gun whereby completion of the circuit through the trigger switch causes concurrent energization of said motor means and of said welding material.

4. An electrical welding apparatus and system as defined in claim 3 including a manually operated disconnect switch in series with said "inch" switch when said "inch" switch is in said second position to thereby permit deenergization of said relay means when said "inch" switch is in said second position.

5. An electrical welding apparatus and system adapted to be used selectively for either automatic or semi-automatic welding operation, comprising electric motor means for feeding an elongated welding material to a workpiece; an electrical circuit for said motor means and an electrical circuit connecting said welding material to a source of electrical power, a control relay means including a control coil and a normally closed contact and first and second normally open contacts; said normally closed contact being opened and said normally open contacts being closed when said control coil is energized; said normally closed contact of said relay means being in circuit with said motor means; one of said normally open contacts of said relay means being effective when closed to complete the power supply circuit to said welding material; a selector switch means selectively operable to a first position for automatic welding operation and to a second position for semi-automatic welding operation; a manually operable "inch" switch connected to said selector switch when said selector switch is in said first position, said "inch" switch including a normally closed contact in circuit with said control coil of said relay and a normally open contact in circuit with said motor means; said "inch" switch being manually actuable to open said normally closed contact thereof in circuit with said control coil of said relay means to thereby deenergize said relay means and to close said normally open contact thereof in series with said motor means whereby said motor means is energized; deenergization of said relay means being effective to maintain open said normally open contact of said relay means which controls the power supply circuit to the welding material whereby the welding material is deenergized to permit "cold inching" of the welding material; said "inch" switch when in unactuated position completing a circuit through said normally closed contact thereof to energize said control coil of said relay means, whereby said first and second normally open contacts of said control relay means are closed to energize said motor and to complete the power supply circuit to said welding material; said selector switch when in said second or semi-automatic position being in circuit with said control coil of said relay means and with the trigger switch on a welding gun whereby completion of the circuit through the trigger switch energizes said control coil to thereby close said first and second normally open contacts of said control relay means to concurrently energize said motor and to complete the power supply circuit to said welding material.

6. An electrical welding apparatus and system as defined in claim 5 including a manually operated disconnect switch in series with said normally closed contact of said "inch" switch and with said control coil of said relay means to permit deenergization of said control coil when said normally closed contact of said "inch" switch is in its closed position.

References Cited in the file of this patent
UNITED STATES PATENTS

| | | |
|---|---|---|
| 2,752,469 | Price | June 26, 1956 |
| 2,845,526 | Cameron | July 29, 1958 |